I. CHARET.
SCALE.
APPLICATION FILED DEC. 28, 1911.

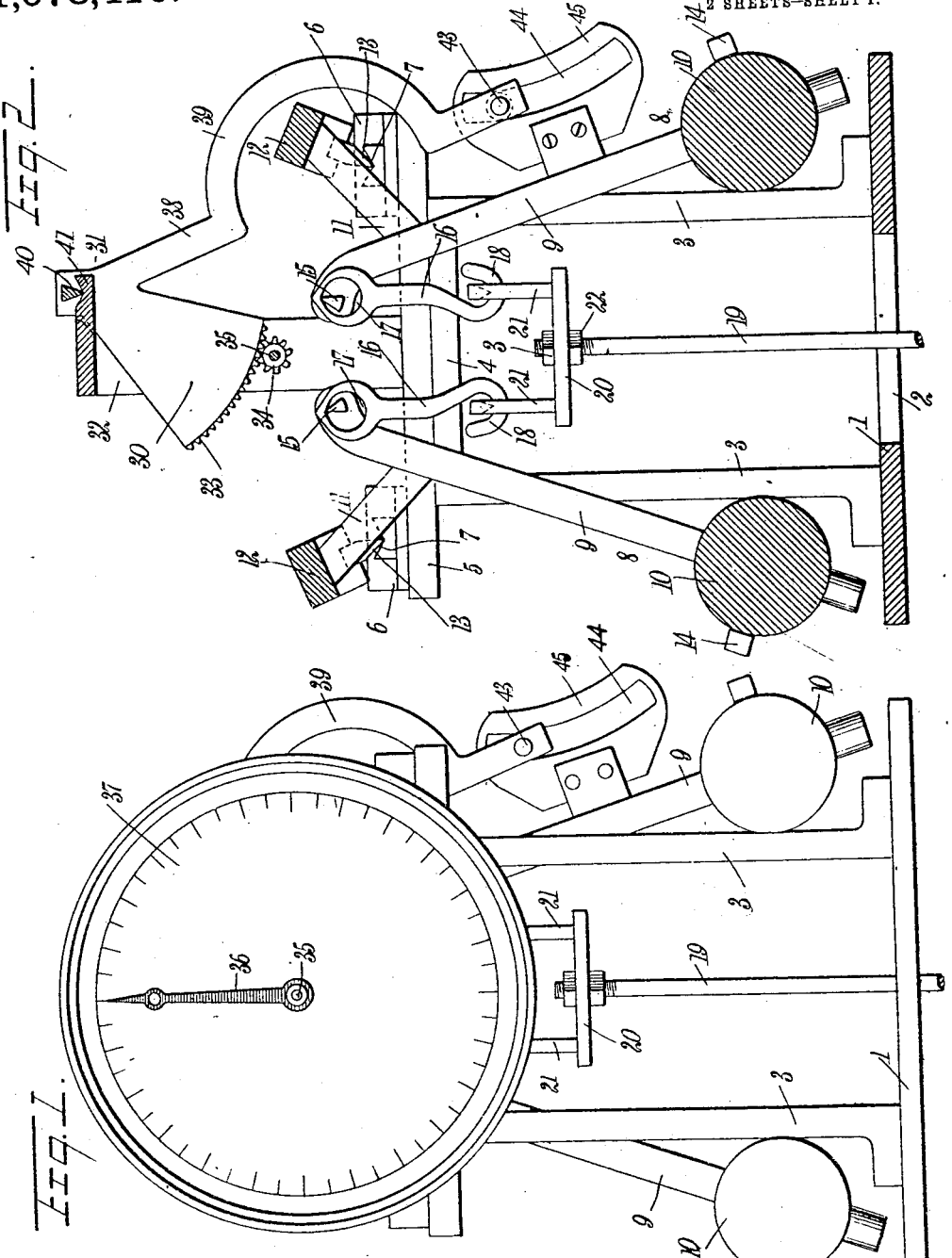

1,078,416.

Patented Nov. 11, 1913.
2 SHEETS—SHEET 2.

WITNESSES
H. J. Walker
L. J. Gallagher

INVENTOR
Israel Charet
BY Munn & Co
ATTORNEYS

UNITED STATES PATENT OFFICE.

ISRAEL CHARET, OF NEW YORK, N. Y.

SCALE.

1,078,416.  Specification of Letters Patent.  Patented Nov. 11, 1913.

Application filed December 28, 1911. Serial No. 668,283.

*To all whom it may concern:*

Be it known that I, ISRAEL CHARET, a subject of the Czar of Russia, and a resident of the city of New York, borough of Brooklyn, in the county of Kings and State of New York, have invented a new and Improved Scale, of which the following is a full, clear, and exact description.

My invention relates generally to scales and more particularly comprehends a new and improved scale head construction, the device being adapted for use with platform scales of different makes.

The principal object of my invention is to provide a new and improved scale head made up of a plurality of moving parts by which a sector is actuated whereby the deflection or moving of the said parts is indicated on a suitable scale, thereby evidencing the load on the platform of the scales.

A further object of my invention is to provide a scale head made up of a plurality of parts coöperating with each other, the said head, however, being adapted for modification in that one-half of the said head may be used with small platform scales whereas the head, as an entirety, or when constructed of the plurality of simple parts, is more particularly for use with platforms sustaining heavy loads.

A further object of the invention is to provide a scale head having a lever of suitable construction movably mounted at one end, the lever being adapted to be actuated by the movement of the platform so that the load carried on the platform will move the lever, the point about which the lever swings being fixed.

A further object of the invention is to provide a scale head having a plurality of movable levers adapted to be simultaneously actuated by a platform so that the levers will move together when a load is applied to the platform, the points about which the levers swing being fixed.

A further object of the invention is to provide a new and improved means for moving a pointer over a suitable dial, the said means being actuated by the movement of the lever in the scale head.

Reference is to be had to the accompanying drawings forming a part of this specification, in which similar characters of reference denote corresponding parts in all the views, and in which—

Figure 3:
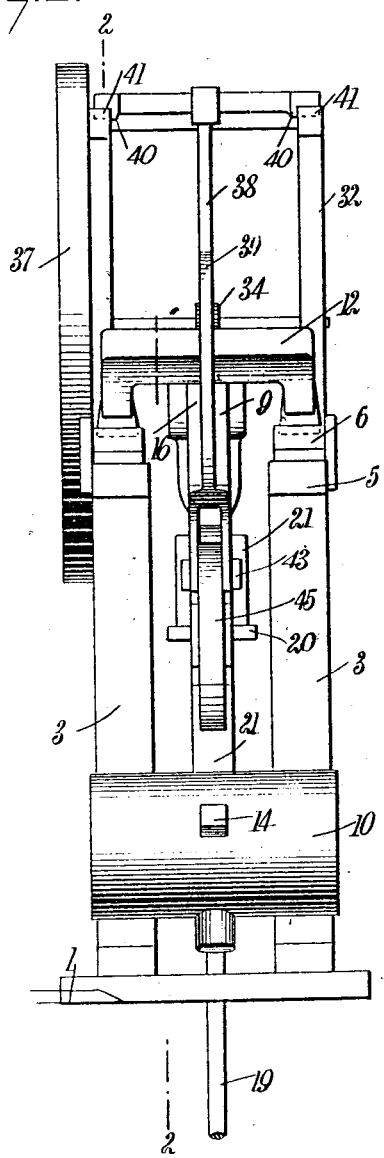
Figure 4:
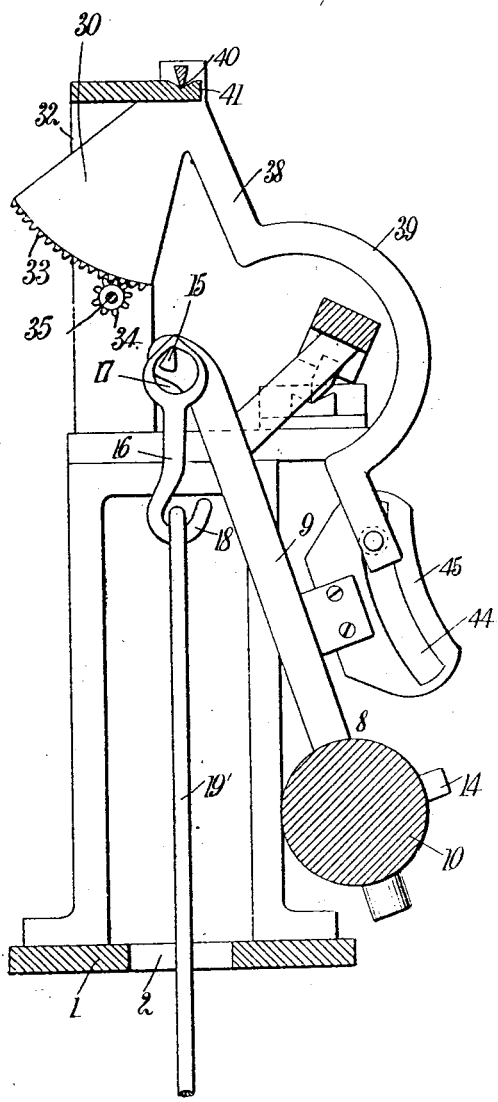

Figure 1 is a front view of the scale head; Fig. 2 is a vertical sectional view thereof on the line 2—2 of Fig. 3; Fig. 3 is a right end view of Fig. 1; Fig. 4 is a view similar to Fig. 2 but showing one-half of the head adapted for use with certain platforms.

Referring particularly to Figs. 1 to 3 inclusive, the scale head comprises a fixed support made up of the base 1 having an opening 2 therein, there being suitable standards or uprights 3 carried by the base and positioned adjacent the front and rear thereof, each pair of uprights being preferably connected together at their upper portions by means of a cross piece 4.

Resting on top of each pair of uprights is a support 5 having bearings 6 thereon, there being suitable members carried by the bearings and provided with V-shaped recesses 7 in the upper faces, these bearings forming rests for pivotally mounting the swinging levers 8 in position.

Each lever 8 comprises a major portion 9 having a mass of suitable material 10 adjustably secured at the outer end thereof, the lever also comprising a minor portion, in the nature of an offset arm 11, the outer end thereof being provided with a transversely extending element 12 at the opposite ends of which are knife-edges 13, the four knife-edges engaging at the bottom of the V-shaped recesses 7 in the bearings 6. Each mass of material 10 which is preferably in the form of a ball is secured in position on the portions 9 of the lever by means of a set screw 14. The upper end of each of the major portions 9 on each side is provided with lugs 15 which are preferably wedge-shape in cross section, such a construction providing for knife-edge supports with suitable hooks 16 having openings 17 therein, the side wall of the openings resting on the said knife edges. The lower end of each hook is provided with a bent portion 18, the suspending lever 19 being in engagement with each of these bent portions 18 through the medium of a transversely extending bar 20 having upstanding parts 21 thereon which engage with these bent portions. The transversely extending bar 20 is adjustably secured at the end of the suspending lever by means of nuts 22 which engage the threaded end of the suspending lever.

From what has been said it will be obvious that if the suspending lever 19 is engaged with a platform of a scale which is properly mounted in a suitable pit that downward movement of this suspending lever when a load is applied to the platform will move the hooks 16 down, the levers 8 being then swung outwardly away from each other about the knife edges 13 as centers; the movement of each of the levers, however, is determined by the mass of material 10 at the outer end of each of the levers and also by the position of these masses on the levers. The weights 10 may be so adjusted that the outward movement of the levers will vary when the same load is applied to the scales, thereby providing for the same scale head being used with scales for weighing loads over different ranges.

In order that the outward movement of either lever 8, which movement depends on the load, may be properly indicated I have provided a dial with a pointer playing thereover in order that the load may be announced. This indicating device preferably comprises a sector 30 which is rotatably carried between opposite sides of the upstanding frame 32 which is mounted on the scale head in any suitable position; the edge portion of the sector is provided with a rack 33 which engages a pinion 34 mounted on a spindle 35, the front end of the spindle being provided with a pointer 36 which moves around a preferably circular dial 37. Movement of the levers 8 is transmitted to the pointer 36 by means of the connecting bar 38, preferably integral with the sector, the intermediate portion 39 being preferably offset in order to provide for compact arrangement of the parts, the upper end of the bar being provided with knife edges 40 resting in suitable supports 41 having V-shape notches therein; these supports are preferably carried by the before-mentioned upstanding frame 32. The upper end of this connecting bar is shown integral with the sector 30 although it is obvious that they may be made separately and suitably connected together. The lower end of the bar 38 is preferably bifurcated and is provided with a transversely extending pin 43, which pin engages in the arcuate slot 44 carried by a fixed element 45 which is secured to the side of one of the levers 8.

It will be obvious that as the suspending lever 19 is moved downwardly that the levers 8 will swing about the knife edge supports 13 as centers, the weights 10 thereby moving away from each other, the pin and slot engagement with the parts 33, 34, causing the connecting bar 38 to move about the knife edge supports 40, 41, as centers, thereby turning the sector or quadrant 30 and with it the spindle 34, tne angular travel of the spindle moving the pointer over the dial 37.

It is to be noted that each of the supports about which the levers 8 move is fixed and that the weights 10 are also fixed with respect to the levers so that the same travel of the suspending lever 19 will always cause either lever 8 to move through the same angle.

Referring particularly to Figs. 1 and 2 it will be noted that the provision of the sector 30 and the pinion 34 provides for utilizing all of the dial 37, it being clear that the numerals placed thereon may be such as are fitted to the size of the scales, which means that the weights 10 may occupy different positions in scales registering different maximum amounts when these scales are provided with the same scale heads. It will also be noted that by reason of the small number of contacts of the various moving parts that the friction is materially reduced, the balance of the scale head being substantially identical after each weighing by the scale.

One feature of the scale head herein described and illustrated is that the construction thereof permits the use of one-half of the head in the case of small scales and in Fig. 4 such a scale is illustrated. In this scale the departure from what is shown in Figs. 1 to 3 lies in the fact that the suspending rod 19' is secured at its upper end directly to the bent end 18 of the hook 16, the opening 17 in the upper end of the hook engaging the knife edge or wedge-shape support 15 at the upper end of the lever 8. As the scale head here shown is substantially one-half of that previously described, it is believed that the operation thereof will be clearly understood from what has been previously said, the parts used being identical, with the exception noted, to what has gone before.

In conclusion it is to be noted that the scale head herein shown is made up of few parts; the parts are articulated in such a way, by reason of the knife-edge supports, as to structure and number that the friction is reduced to a minimum and a more perfect balance is obtained, these features tending to the production of a scale head offering many advantages and overcoming many of the defects present in devices now used for the same purpose.

Having thus described my invention, I claim as new, and desire to secure by Letters Patent:—

1. A scale head comprising bearings, each bearing being provided with a V-shaped recess, a movable lever comprising a major portion having a mass of material secured adjacent its outer end, the inner end of the said major portion being provided with knife-edge supports, an offset arm extending from the major portion, the outer end of the arm being provided with knife-edges, these said knife-edges engaging in the beforementioned V-shaped recesses, a link engaging the knife-edge supports on the major portion, indicating mechanism, and a connecting bar for actuating the indicating mechanism and in slidable engagement with the said movable lever whereby swinging of the lever is transmitted to the indicating mechanism.

2. A scale head comprising bearings, each bearing being provided with a V-shaped recess, a movable lever having a mass of material secured adjacent its outer end, the other end of the lever being provided with knife-edge supports, an offset arm extending from the lever, the outer end of the said arm being provided with knife-edge supports, the said knife-edge supports engaging in the before mentioned V-shaped recesses, a link engaging the knife-edge supports on the said lever, indicating mechanism, a connecting bar for actuating the said mechanism, the said bar being in movable engagement with the said lever, the said engaging means comprising a pin and slot so that when the lever swings the bar will be moved thereby, actuating the indicating mechanism.

3. A scale head comprising fixed bearings, each bearing being provided with a V-shaped recess, a movable lever comprising a major portion having a mass of material secured adjacent its outer end, the inner end of the said major portion being provided with a plurality of knife-edge supports, an offset arm extending from the major portion adjacent the said knife edges, the outer end of the said arm being provided with a transversely extending element having a knife edge support at each end thereof, the said knife edges engaging in the before-mentioned V-shaped recesses, a suspending link engaging the said knife edge supports on the major portion, a dial, a pointer moving over the dial, a spindle on which the pointer is mounted, a pinion on the spindle, a sector pivotally mounted in position and having a rack thereon, the rack engaging the pinion, together with a connecting bar actuating the said sector and in slidable engagement with the said major portion whereby swinging of the said portion is transmitted to the pointer.

4. A scale head comprising fixed bearings, each bearing being provided with a V-shaped recess, a movable lever comprising a major portion having a mass of material secured adjacent its outer end, the inner end of the said major portion being provided with a plurality of knife-edge supports, an offset arm extending from the major portion adjacent the said knife edges, the outer end of the said arm being provided with a transversely extending element having a knife edge support at each end thereof, the said knife edges engaging in the before-mentioned V-shaped recesses, a suspending link engaging the said knife edge supports on the major portion, a dial, a pointer moving over the dial, a spindle on which the pointer is mounted, a pinion on the spindle, a sector pivotally mounted in position and having a rack thereon, the rack engaging the pinion, a connecting bar actuating the rack, the other end of the bar being provided with a transversely extending pin, a fixed element provided with a slot secured to the said major portion, the said transversely extending pin engaging in the said slot whereby swinging of the said portion is transmitted to the pointer.

5. A scale head comprising a lever having an offset arm therefrom, the outer end of the lever having a mass of material secured thereto, the other end of the lever being adapted to be actuated by a platform, the mass of material and the lever swinging about the outer end of the said arm as a center, a dial, a pointer moving over the dial, a sector pivotally mounted in position actuating the pointer, a connecting bar actuating the sector, the outer end of the connecting bar being provided with a transversely extending pin, the said lever being provided with a fixed element having an arcuate slot therein, the said transversely extending pin engaging in the said slot whereby swinging of the said portion is transmitted to the pointer.

6. A scale head comprising a fixed support having a plurality of bearings thereon, a plurality of movable levers, each lever being provided at one end with a mass of material adjustably secured thereto, the opposite ends of the levers being provided with knife-edge supports, an angularly extending offset extending from each of the levers adjacent the end having the knife-edge supports, the ends of the said offset arms being provided with knife-edge supports engaging in the said bearings, hooks engaging the said knife-edge supports at the ends of the levers and means adapted to be actuated by a platform for moving the hooks simultaneously and with them the levers whereby the said masses of material are moved away from each other about the said knife edges and bearings as centers.

7. A scale head comprising a plurality of fixed bearings, a plurality of levers each of which has a mass of material secured at its outer end, an offset arm adjacent the other end of each of the levers, the outer end of each offset arm being provided with a plurality of knife-edge supports, the said knife-edge supports engaging in the said bearings, thereby forming points of pivotal support for the said levers, knife-edge supports carried by each of the levers, a hook engaging each of the knife-edge supports, means for connecting the hooks together, a suspending lever engaging the said means, a dial, a pointer moving over the dial, a connecting bar for actuating the pointer, one end of the connecting bar being pivotally mounted in position and the other end being in slidable engagement with one of the levers whereby, when the said suspending lever is moved in order to swing the said masses of material, the angle of swing may be indicated on the said scale.

8. A scale head comprising a dial, a pointer moving over the dial, a spindle on which the pointer is fixed, a sector pivotally mounted in position for actuating the spindle, a connecting bar for actuating the sector, the outer end of the said bar being provided with a transversely extending pin, a plurality of movable levers pivotally mounted in position, the outer end of each lever being provided with a mass of material adjustably held in position, one of the levers being provided with a fixed element, an arcuate slot in the said element, the said pin engaging in the said slot whereby, as the levers are moved, the angle of swing may be indicated by the said pointer by reason of the pin and slot engagement between the said lever and the connecting bar.

9. In a scale, the combination of a plurality of adjacent levers provided with oppositely extending offset arms, the said arms being provided with knife-edges, engaging supports whereby the levers are held in position, the lower ends of the levers being provided with masses of material, the upper ends of the levers being provided with knife-edges, a plurality of hooks, one end of each hook being provided with an opening, the side walls of the openings engaging the knife-edges on the levers, a transversely extending bar, and up-standing parts carried by the bar and engaging the lower ends of the hooks, the said bar being adapted to be secured to a draft rod, whereby movement of the draft rod is imparted to the said levers.

10. A scale head comprising a lever having an angularly extending offset arm, the lever to one side of the arm being provided with a mass of material, the said lever to the other side of the arm being provided with means whereby a draft rod may be connected thereto, the said arm being provided with knife edges, supports engaging the knife edges, indicating mechanism, a sector movably mounted in position and coöperatively associated with the indicating mechanism, a bar for moving the sector, and a pin-and-slot engagement between the bar and the said lever, whereby movement of the draft rod moves the lever, the said movement being imparted to the indicating mechanism through the said bar and sector.

In testimony whereof I have signed my name to this specification in the presence of two subscribing witnesses.

ISRAEL CHARET.

Witnesses:
 MAX A. COHEN,
 LAURENCE J. GALLAGHER.

---

Copies of this patent may be obtained for five cents each, by addressing the "Commissioner of Patents, Washington, D. C."